United States Patent [19]

Kreger et al.

[11] Patent Number: 4,906,023
[45] Date of Patent: Mar. 6, 1990

[54] SLOTTED LINK SEAT BELT INTER-CONNECTING POINT LINK

[75] Inventors: James L. Kreger; James W. Hofrichter, both of Reedsburg, Wis.

[73] Assignee: Seats, Inc., Reedsburg, Wis.

[21] Appl. No.: 313,617

[22] Filed: Feb. 21, 1989

[51] Int. Cl.$^4$ .............................................. B60R 21/10
[52] U.S. Cl. .................................... 280/806; 297/473; 280/801
[58] Field of Search ....................... 280/801, 804, 806; 297/743

[56] References Cited

U.S. PATENT DOCUMENTS

| | | | |
|---|---|---|---|
| 3,226,674 | 12/1965 | Eriksson | 280/801 |
| 3,281,818 | 10/1966 | Morgan et al. | 280/801 |
| 3,323,829 | 6/1967 | Liem | 280/806 |
| 4,200,311 | 4/1980 | Reid et al. | 280/801 |
| 4,718,696 | 1/1988 | Koide et al. | 280/801 |

OTHER PUBLICATIONS

Federal Motor Vehicle Safety Standard No. 207, 1/1/72.
Federal Motor Vehicle Safety Standard No. 210, 7/79.
Seats Inc. Publication Form 16-102(12/83).
Seats Inc. Drawing No. 16-138(11/87).

*Primary Examiner*—Kenneth R. Rice
*Attorney, Agent, or Firm*—Michael, Best & Friedrich

[57] ABSTRACT

A seat belt support assembly providing for shifting of the load on the seat belt from an anchor link connected to the vehicle seat to a tether belt connected to the vehicle frame.

10 Claims, 1 Drawing Sheet

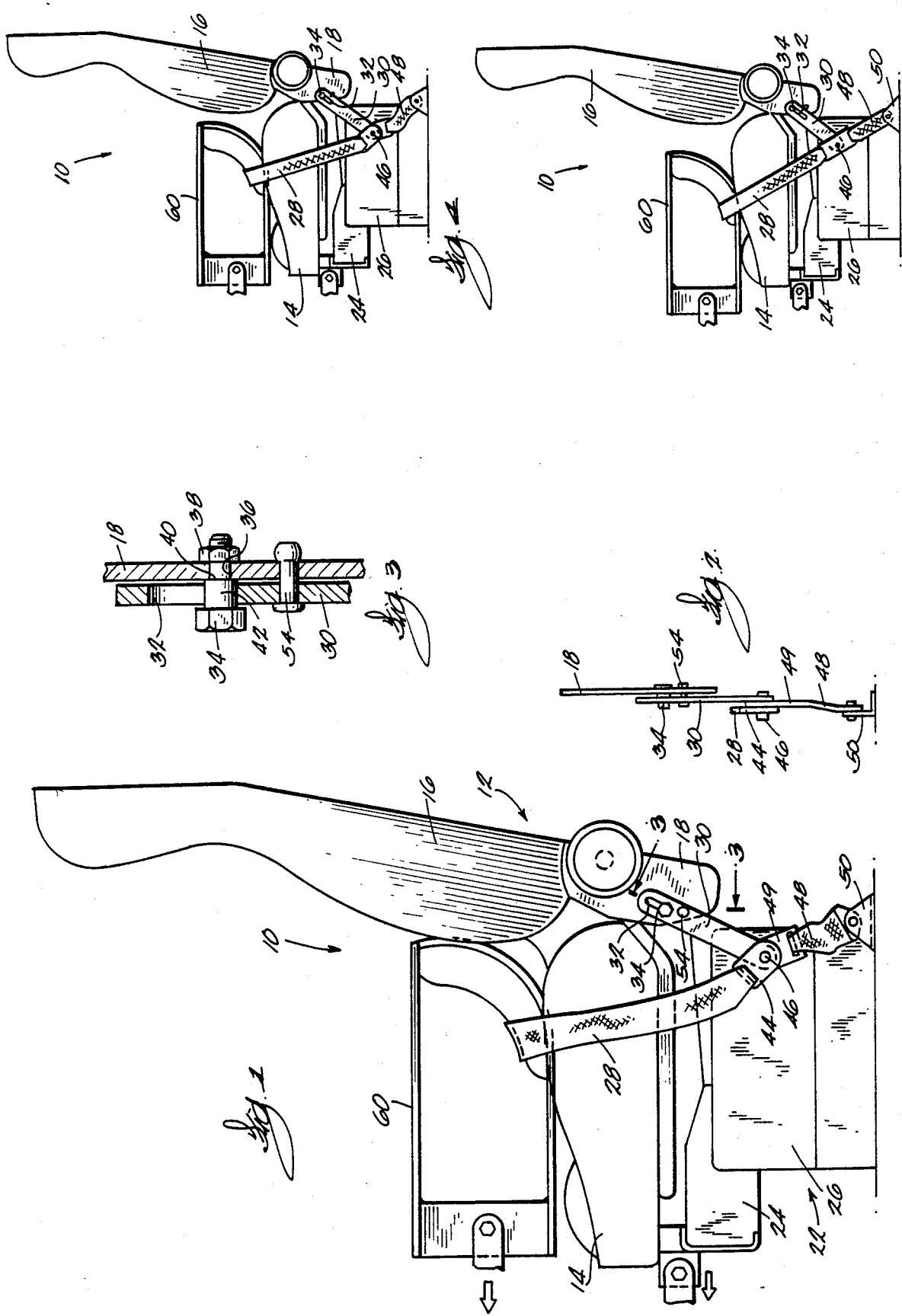

SLOTTED LINK SEAT BELT INTER-CONNECTING POINT LINK

FIELD OF THE INVENTION

The invention is related to automotive and truck seat assemblies and more particularly to apparatus for anchoring seat belts in such seat assemblies.

BACKGROUND PRIOR ART

Standards for use in testing the strength of supports for automotive and truck seats are set forth in Federal Motor Vehicle Safety Standard No. 207, and the standards for use in testing the strength of seat belt assembly anchorages for automobiles and trucks is set forth in Federal Motor Vehicle Safety Standard No. 210. Those standards require that the seat anchorage withstand certain test loads applied to the seat and that the seat belt anchorage also withstand certain predetermined test loads. In order to minimize the loading applied to the seats and to the seat support structure, the seat belt assemblies should provide for transfer of loads from the seat belts directly to the vehicle frame rather than to the seat structure or the seat support structure during the test procedures.

In some prior art truck seat assemblies, the seat belt interconnecting point structure includes a bar extending horizontally rearwardly of the seat frame, the rearward end of that bar supporting an upwardly and rearwardly extending arm. The lower end of that arm is supported by the rearward end of the horizontal bar, and the upper end of the arm provides an interconnecting point to the end of a lap seat belt. A tether belt has one end anchored to the vehicle frame and an upper end secured to the interconnecting point at the upper end of the arm. With this arrangement, during normal operation, the seat belt is supported at the upper end of the arm and by the sea frame. However, in the event that a large load is applied to the seat lap belt applying a large upward and forward load o the seat belt, the arm will pivot forwardly and the load on the seat belt will be applied through the tether belt to the tether belt anchor fixed to the vehicle frame. Accordingly, this large load on the seat belt is not applied to the seat belt frame but instead to the vehicle frame. This arrangement, however, requires considerable space rearwardly of the vehicle seat and the seat frame and is not suitable in many truck seat applications.

In prior art arrangement, steel brackets are fixed to opposite sides of the seat frame and project laterally outwardly from the seat. The outer end of each bracket comprises an interconnecting point for connecting the seat belt to the seat frame. A tether belt having one end connected to the vehicle frame is connected to the projecting end of the bracket. The bracket is comprised of a flexible metal so that when very heavy loads such as test loads are placed on the seat belt, the bracket will deform such that the load on the sea belt will be transferred to the tether belt and to the vehicle frame rather than to the seat frame.

In another prior art arrangement, a link is connected to the side of the vehicle seat frame, the link extending downwardly and forwardly and in a plane parallel to the side plate of the seat frame. The lower end of the link functions as the interconnecting point for attachment of the seat belt. The upper end of the link includes a bore, and a bolt extends through the bore to secure the upper end of the link to the side plate of the vehicle seat. The link is also fixed to the side plate by a pop rivet spaced from the bolt. The pop rivet is intended to prevent pivotal movement of the link with respect to the side plate about the pivot axis of the bolt during normal operation of the vehicle seat. In the event of a substantial load on the seat belt, thereby applying a substantial upward and forward load on the interconnecting point at the lower end of the link, the link will pivot about the bolt, thereby shearing the pop rivet. The link can then pivot about the bolt until the seat belt force is applied directly to the tether belt and transmitted by the tether belt to the vehicle frame rather than to the seat support structure.

SUMMARY OF THE INVENTION

The invention provides a vehicle seat assembly having an improved apparatus for attachment of a seat belt to the seat frame and the vehicle frame. The apparatus includes a link having a horizontally extending slot in its upper end. A shoulder bolt extends through the slot and is fixed to the side plate of the vehicle seat frame. The slot in the end of the link has a width slightly greater than the diameter of the shoulder portion of the shoulder bolt such that the link can pivot with respect to the shoulder bolt. The link extends downwardly and includes a lower end functioning as an interconnecting point for a seat belt. An upper end of a tether belt is also connected to the interconnecting point of the link. A pop rivet connects the link to the side plate of the seat assembly to releasably prevent pivotal movement of the link with respect to the side plate. In the event a large forward load is placed on the seat belt, the upward and forward force on the lower end of the link will cause the pop rivet to shear, and the link will slide downwardly with respect to the shoulder bolt until the upper end of the slot engages the shoulder bolt whereupon the link will pivot on the bolt such that the interconnecting point will move upwardly and forwardly and the load on the seat belt will be applied directly to the tether bolt and to the vehicle frame.

One advantage of the invention is that it provides a means for properly positioning the seat belt during normal operation of the vehicle while also providing an improved means for transferring high loads on the seat belt to a tether belt and to the vehicle frame rather than application of those loads to the seat frame or the structure supporting the vehicle seat.

Another advantage of the apparatus embodying the invention is that it provides a relatively compact assembly of components and does not require unnecessary space or clearance either behind the vehicle seat or at the sides of the seat.

Additional features and advantages of the invention will be apparent by reference the following description of a preferred embodiment, from the drawings and from the claims.

BRIEF DESCRIPTION OF THE DRAWINGS

FIG. 1 is a side elevation view of the vehicle seat assembly embodying the invention.

FIG. 2 is an end view of a portion of the apparatus shown in FIG. 1.

FIG. 3 is an enlarged view of a portion of the apparatus illustrated in FIG. 1 and taken along line 3—3 in FIG. 1.

FIG. 4 is view similar to FIG. 1 and shows the seat belt assembly subjected to a forward force and showing the interconnecting point link pivoting forwardly.

FIG. 5 is a view similar to FIGS. 1 and 4 shows the seat belt assembly subjected to a large forward force and the force on the seat belt transmitted to the tether belt and to the vehicle frame.

Before describing a preferred embodiment of the invention in detail, it is to be understood that the invention is not limited to the details of the construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

FIG. 1 illustrates a vehicle seat assembly 10 embodying the invention and in the particular embodiment of the invention shown, the vehicle seat assembly 10 comprises a truck seat 12 having a seat cushion 14 and a seat back 16. The seat 12 also includes rigid frame members 18 adjacent the lower portion of the seat back 16 and the rearward portion of the seat cushion 14. In the illustrated arrangement the rigid frame members 18 each comprise a plate. The truck seat 12 is also supported by a frame assembly 22 including a suspension structure 24 for supporting the seat 12 for forward and rearward adjustable movement and for vertical adjustable movement. The frame assembly supporting the truck seat is conventional and will not be described in detail. However, the frame assembly includes a base 26 adapted to be fixed to the vehicle frame and supporting the suspension structure 24.

The vehicle seat assembly 10 also includes a lap seat belt 28 having opposite ends and a pair of anchor links 30 connected to the side plates 18 of the seat 12 and supporting the opposite ends of the seat belts 28. More specifically, each link 30 comprises an elongated relatively flat bar positioned parallel to and adjacent to the outside of the side plate 18. Each link 30 includes an upper end having a slot 32 formed therein, the slot 32 extending in the direction of the longitudinal axis of the link. A shoulder bolt 34 extends through the slot 32 and through a bore 36 in the side plate 18, the bore 36 having a diameter of less than the width of the slot 32, and the shoulder bolt 34 being secured to the side plate 18 by a nut 38. The shoulder bolt 34 includes a shoulder 40 adapted to be drawn against the side plate 18 by the nut 38 such that the bolt 34 is fixed to the side plate. The width of the slot 32 is slightly greater than the diameter of the shank 42 of the shoulder bolt 34, and the length of the shank 42 comprising the distance between the shoulder 40 and the head 44 of the bolt is slightly greater than the thickness of the link 30 such that the link 30 is supported by the shoulder bolt 34 for pivotal movement about the axis of the bolt and for limited movement in the direction of the length of the slot 32.

The link 30 extends downwardly and somewhat forwardly with respect to the side plate 18 of the seat, and the lower end of the link 30 includes a hole permitting attachment of an anchor 44 at the end of the seat belt 28 to the lower end of the link by a bolt 46. The upper end of a tether belt 48 also includes an anchor 49 connected to the lower end of the link 30 by the bolt 46, and the lower end of the tether belt 48 is fixed to the vehicle frame by an anchor 50. As shown in FIG. 1, the link 30 can be positioned such that the seat belt 28 can extend upwardly and forwardly at an angle of approximately 65° with respect to horizontal. The tether belt 48 is intended to be relatively slack to permit adjustable movement of the seat 12 forwardly and rearwardly as well as up and down throughout its normal range of movement.

Means are also provided for releasably securing the link 30 in position with respect to the side plate 18, and as shown in FIGS. 1-3, to prevent relative movement of the link 30 with respect to the seat. While other means could be used to releasably secure the link 30 in place, in the illustrated arrangement a blind rivet or pop rivet 54 extends through aligned holes provided in the link 30 and the seat side plate 18. In the illustrated arrangement, when the link 30 is secured to the side plate 18, the link is positioned such that the shoulder bolt 34 is at the lower end of the slot 32.

FIG. 1 also illustrates a test fixture or frame 60 for use in applying a test load to the seat belt assembly. The test fixture 60 which can be positioned on the seat and secured in place by the seat belt 28. A predetermined forward load can be applied to the fixture 60 in the forward direction to simulate extreme loads being applied to the seat belt.

During operation of the vehicle seat belt assembly, when a large forward force or load is placed on the seat belt 28 such as by the test frame 60 illustrated in FIGS. 1, 4, and 5, the seat belt 28 will apply a forward and upward force on the lower end of the interconnecting point link 30. Large forces on the link 30 will cause shearing of the blind rivet 54 as shown in FIG. 4, and the link 30 will then move downwardly and forward with respect to the shoulder bolt until the upper end of the slot 32 engages the shoulder bolt 34. The link 30 will then pivot on the shoulder bolt 34 such that the lower end of the link moves upwardly and forwardly until the slack in the tether belt 48 is removed. The tether belt 48 then becomes taut, and the tether belt 48 will transfer the load on the seat belt directly to the vehicle frame and remove that load from the seat support assembly.

The apparatus embodying the invention thus provides a mechanism for supporting vehicle seat belts such that they are conveniently accessible during normal operation of the vehicle while also providing a means for shifting a load applied to the seat belt from the seat support assembly directly to the vehicle frame in the event of a very large load is applied to the seat belt.

The apparatus embodying the invention also provides a compact and space-saving arrangement which does not limit the relative adjustable movement of the vehicle seat nor require extra clearance space rearwardly of the seat or at the sides of the seat.

Various features of the invention are set forth in the following claims.

We claim:

1. A vehicle seat belt assembly for use in a vehicle having a frame, a vehicle seat having a cushion including a rearward portion and a forward portion, a seat back having an upper portion and a lower portion, and a rigid frame member adjacent the lower portion of the seat back and adjacent the rearward portion of the cushion, a seat support supporting the vehicle seat for movement with respect to the vehicle frame, the vehicle seat belt assembly comprising:

a seat belt anchor link having opposite ends, one of the opposite ends including a slot, a first fastener for securing the one of the opposite ends of the anchor link to the rigid frame member for pivotal movement, the first fastener extending through the slot in the end of the link, a seat belt having one end attached to the other of the opposite ends of the seat belt anchor link, the other of the opposite ends of the seat belt anchor link extending downwardly and forwardly with respect to the first fastener, a tether belt having opposite ends, one end of the tether belt being attached to the other of the opposite ends of the seat belt anchor link and the opposite end of the tether belt being adapted to be fixed to the vehicle frame, and a second fastener releasably securing the anchor link to the rigid frame, the second fastener being spaced from the first fastener.

2. A vehicle seat assembly as set forth in claim 1 wherein said second fastener comprises a blind rivet.

3. A vehicle seat belt assembly as set forth in claim 1 wherein the slot in the one end of the anchor link includes opposite ends, one end of the slot being closer to the opposite end of the anchor link, and wherein the first fastener is housed in said one end of the end of the slot.

4. A vehicle seat belt assembly as set forth in claim 1 wherein the second fastener restrains the anchor link against movement when the force on the anchor link is less than a predetermined force and wherein the second fastener is adapted to shear when the force on the seat belt exceeds a predetermined force, the anchor link then being shiftable in a direction of the length of the link and pivotable about the first fastener from the position extending downwardly and forwardly to a second position wherein the force on the seat belt is transmitted to the tether belt.

5. A vehicle seat belt assembly as set forth in claim 1 wherein the second fastener restrains the anchor link against movement with respect to the rigid frame member when the force on the anchor link in the forward and upward directions is less than a predetermined force and wherein the second fastener shears when the force on the anchor link exceeds the predetermined force whereupon the link moves to a position wherein the force on the seat belt is transmitted to the tether belt.

6. A seat assembly for use in a vehicle having a frame, the seat assembly comprising:

a vehicle seat having a cushion including a rearward portion and a forward portion, a seat back having an upper portion and a lower portion, and a rigid frame member adjacent the lower portion of the seat back and adjacent the rearward portion of the cushion, a seat support supporting the vehicle seat for movement, and a seat belt assembly including a seat belt anchor link having opposite ends, one of the anchor link ends including a slot, the seat belt anchor link extending downwardly and forwardly with respect to the rigid frame member of the seat, a first fastener for securing the one elongated end of the anchor link to the rigid frame member for pivotal movement, the first fastener extending through the slot in the end of the anchor link, a seat belt having one end attached to the opposite end of the seat belt anchor link, a tether belt having opposite ends, one end attached to the opposite end of the seat belt anchor link and an opposite end adapted to be fixed to the vehicle frame, and a second fastener releasably securing the anchor link to the rigid frame, the second fastener being spaced from the first fastener.

7. A vehicle seat assembly as set forth in claim 6 wherein said second fastener comprises a blind rivet.

8. A vehicle seat belt assembly as set forth in claim 6 wherein the slot in the one end of the anchor link includes opposite ends, one end of the slot being closer to the opposite end of the anchor link, and wherein the first fastener is housed in said one end of the slot.

9. A vehicle seat belt assembly as set forth in claim 6 wherein the second fastener restrains the anchor link against movement when the force on the anchor link is less than a predetermined force and wherein the second fastener is adapted to shear when the force on the seat belt exceeds a predetermined force, the anchor link then being shiftable in a direction of the length of the link and pivotable about the first fastener from the position extending downwardly and forwardly to a second position wherein the force on the seat belt is transmitted to the tether belt.

10. A vehicle seat belt assembly as set forth in claim 6 wherein the second fastener restrains the anchor link against movement with respect to the rigid frame member when the force on the anchor link in the forward and upward directions is less than a predetermined force and wherein the second fastener shears when the force on the anchor link exceeds the predetermined force, and wherein the link moves to a position wherein the force on the seat belt is transmitted to the tether belt.

* * * * *